United States Patent
Yang et al.

(10) Patent No.: US 10,637,623 B2
(45) Date of Patent: Apr. 28, 2020

(54) METHOD AND DEVICE FOR TRANSMITTING/RECEIVING WIRELESS SIGNALS IN WIRELESS COMMUNICATION SYSTEM

(71) Applicant: LG ELECTRONICS INC., Seoul (KR)

(72) Inventors: Suckchel Yang, Seoul (KR); Hyunsoo Ko, Seoul (KR); Kijun Kim, Seoul (KR); Byounghoon Kim, Seoul (KR); Jaehoon Chung, Seoul (KR); Eunsun Kim, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/085,537

(22) PCT Filed: Mar. 14, 2017

(86) PCT No.: PCT/KR2017/002759
§ 371 (c)(1),
(2) Date: Sep. 14, 2018

(87) PCT Pub. No.: WO2017/160065
PCT Pub. Date: Sep. 21, 2017

(65) Prior Publication Data
US 2019/0097772 A1 Mar. 28, 2019

Related U.S. Application Data

(60) Provisional application No. 62/308,209, filed on Mar. 14, 2016, provisional application No. 62/372,326, filed on Aug. 9, 2016.

(51) Int. Cl.
*H04W 72/04* (2009.01)
*H04L 5/00* (2006.01)
(Continued)

(52) U.S. Cl.
CPC ......... *H04L 5/0048* (2013.01); *H04B 7/0689* (2013.01); *H04B 7/0695* (2013.01);
(Continued)

(58) Field of Classification Search
None
See application file for complete search history.

(56) References Cited

U.S. PATENT DOCUMENTS 8,750,162 B2 * 6/2014 Lee ................... H04L 5/0007
370/254
9,167,592 B1 * 10/2015 Hsu ................... H04W 76/00
(Continued)

OTHER PUBLICATIONS

PCT International Application No. PCT/KR2017/002759, Written Opinion of the International Searching Authority dated Jul. 10, 2017, 16 pages.

*Primary Examiner* — Sithu Ko
(74) *Attorney, Agent, or Firm* — Lee Hong Degerman Kang & Waimey

(57) ABSTRACT

The present invention relates to a wireless communication system and, particularly, to: a method comprising the steps of acquiring information on the Nr number of receiving beams of a base station, transmitting a first OFDMA symbol having Nr number of SRS symbols, and transmitting a second OFDMA symbol having Nr number of SRS symbols, wherein SRS symbols in the same OFDMA symbol are transmitted in the same transmission beam direction, and SRS symbols in different OFDMA symbols are transmitted in different transmission beam directions; and a device for the same.

10 Claims, 12 Drawing Sheets

(51) Int. Cl.
*H04B 7/06* (2006.01)
*H04B 7/08* (2006.01)
*H04L 27/26* (2006.01)

(52) U.S. Cl.
CPC ........... *H04B 7/088* (2013.01); *H04L 5/0025* (2013.01); *H04L 5/0051* (2013.01); *H04L 5/0094* (2013.01); *H04L 27/261* (2013.01); *H04L 27/2605* (2013.01)

(56) References Cited

U.S. PATENT DOCUMENTS

| | | | |
|---|---|---|---|
| 9,306,721 B2* | 4/2016 | Jung | H04L 5/0055 |
| 2009/0109908 A1* | 4/2009 | Bertrand | H04L 5/0051 |
| | | | 370/329 |
| 2009/0274226 A1 | 11/2009 | Mondal et al. | |
| 2012/0106498 A1* | 5/2012 | Shindo | H04J 13/0022 |
| | | | 13/22 |
| 2013/0322280 A1* | 12/2013 | Pi | H04W 72/0413 |
| | | | 370/252 |
| 2014/0105130 A1 | 4/2014 | Noh et al. | |
| 2014/0241242 A1 | 8/2014 | Josiam et al. | |
| 2015/0009951 A1* | 1/2015 | Josiam | H04L 25/0224 |
| | | | 370/330 |
| 2015/0382205 A1 | 12/2015 | Lee et al. | |
| 2016/0014701 A1 | 1/2016 | Nam et al. | |

\* cited by examiner

METHOD AND DEVICE FOR TRANSMITTING/RECEIVING WIRELESS SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2017/002759, filed on Mar. 14, 2017, which claims the benefit of U.S. Provisional Application No. 62/308,209, filed on Mar. 14, 2016, and 62/372,326, filed on Aug. 9, 2016, the contents of which are all hereby incorporated by reference herein in their entireties.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, there is provided a method for transmitting a signal by a user equipment in a wireless communication system, the method comprising: acquiring information about a number (Nr) of receive (RX) beams from a base station; transmitting a first Orthogonal Frequency Division Multiple Access (OFDMA) symbol having Nr Sounding Reference Signal (SRS) symbols; and transmitting a second OFDMA symbol having Nr SRS symbols, wherein SRS symbols in the same OFDMA symbol are transmitted in the same transmit (TX) beam direction, wherein SRS symbols in different OFDMA symbols are transmitted in different TX beam directions.

In another aspect of the present invention, there is provided a user equipment (UE) for a wireless communication system, the UE comprising: a radio frequency (RF) module; and a processor, wherein the processor is configured: acquiring information about a number (Nr) of receive (RX) beams from a base station; transmitting a first Orthogonal Frequency Division Multiple Access (OFDMA) symbol having Nr Sounding Reference Signal (SRS) symbols; and transmitting a second OFDMA symbol having Nr SRS symbols, wherein SRS symbols in the same OFDMA symbol are transmitted in the same transmit (TX) beam direction, wherein SRS symbols in different OFDMA symbols are transmitted in different TX beam directions.

Preferably, the first and second OFDMA symbols may be included in a single beam scan duration.

Preferably, the first OFDMA symbol and the second OFDMA symbol may be adjacent to each other in the same subframe.

Preferably, a single cyclic prefix (CP) may be allocated to an entirety of SRS symbols in the first OFDMA symbol.

Preferably, a single cyclic prefix (CP) may be allocated to each of SRS symbols in the first OFDMA symbol.

Preferably, a subcarrier spacing of each of SRS symbols in the first OFDMA symbol may be defined as:

$$R*(Nr+L)[KHz],$$

wherein R indicates a subcarrier spacing of a non-SRS signal, Nr indicates a number of the receive beams in the base station, and L indicates an integer of 1 or larger.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
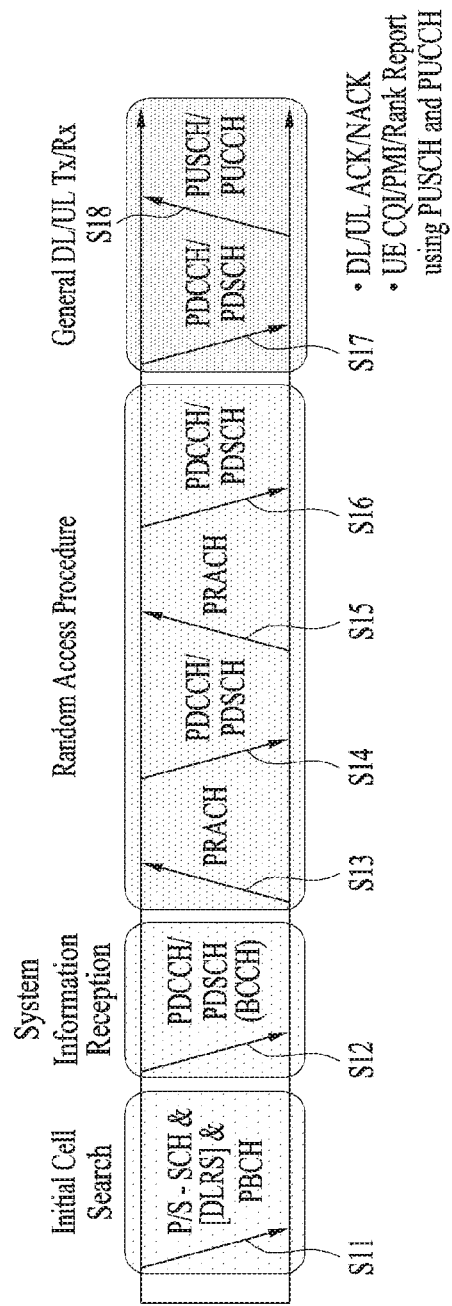
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
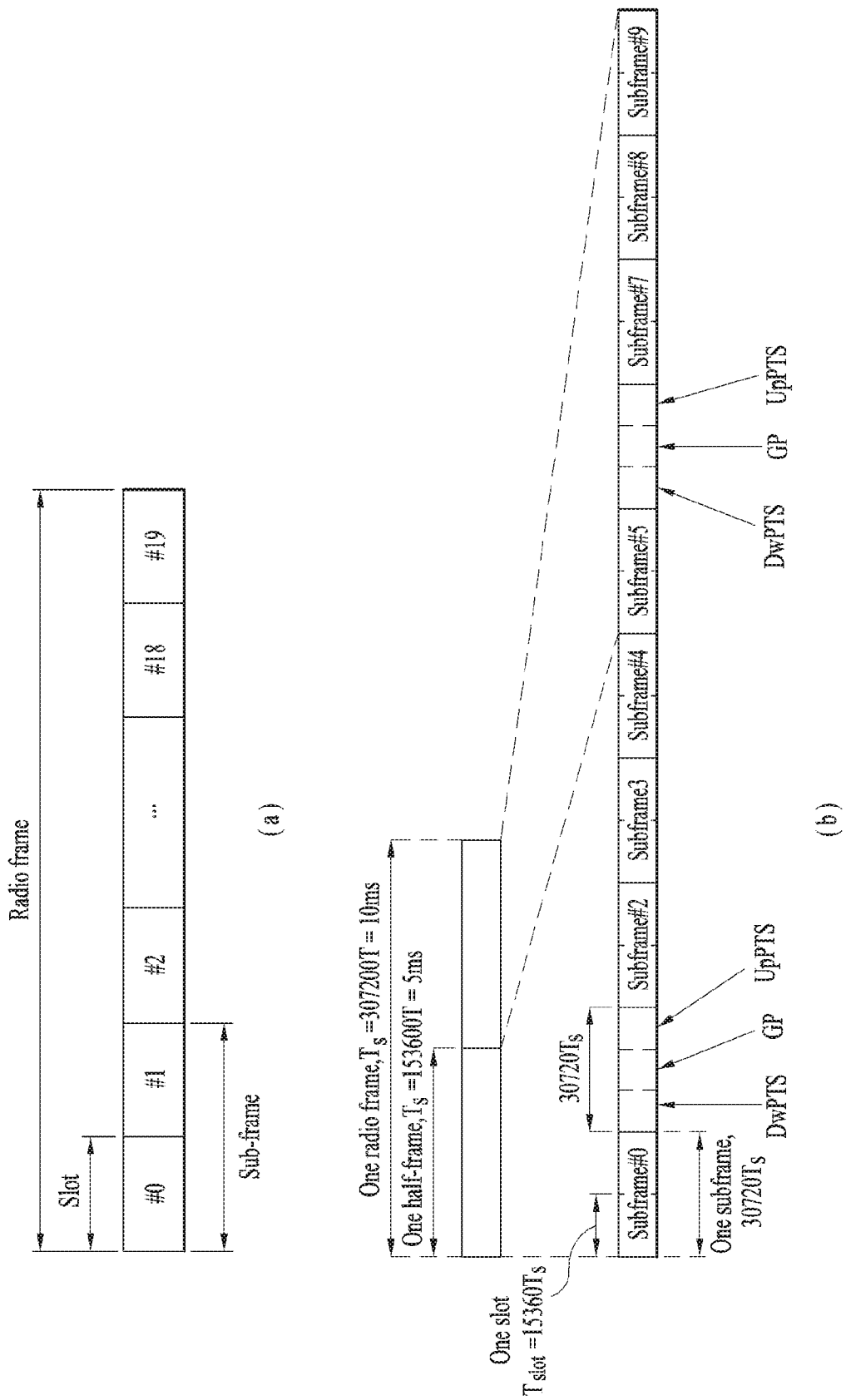
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configu-ration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
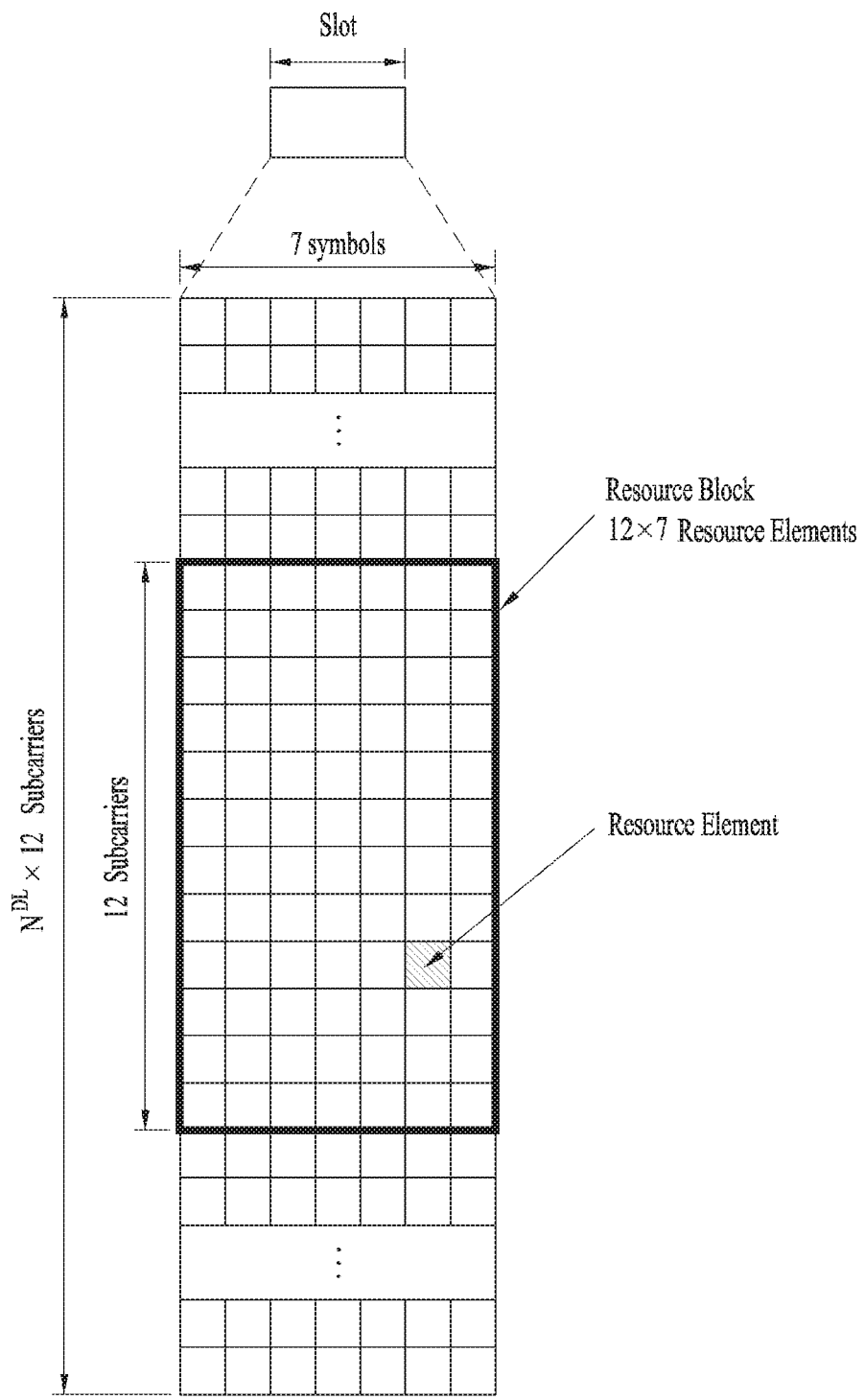
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
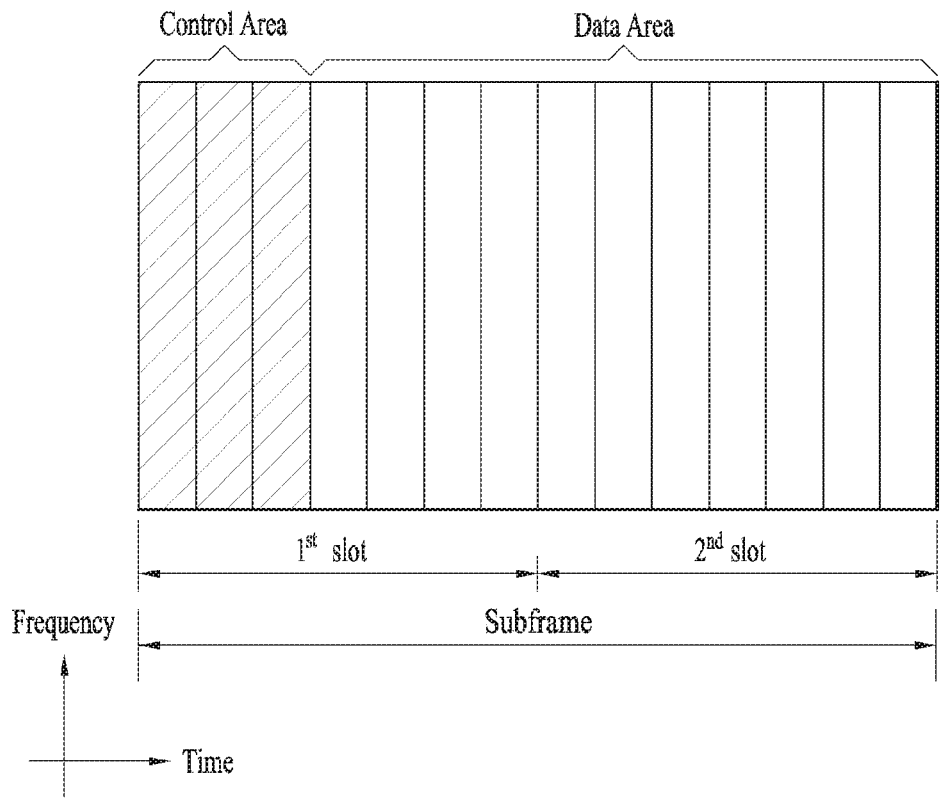
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared channel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
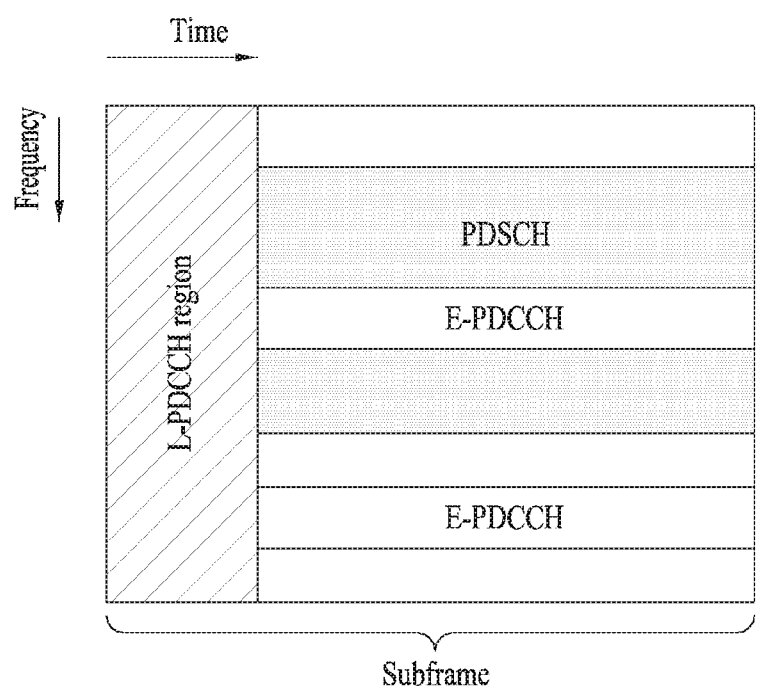
FIG. 5 illustrates an example of an Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
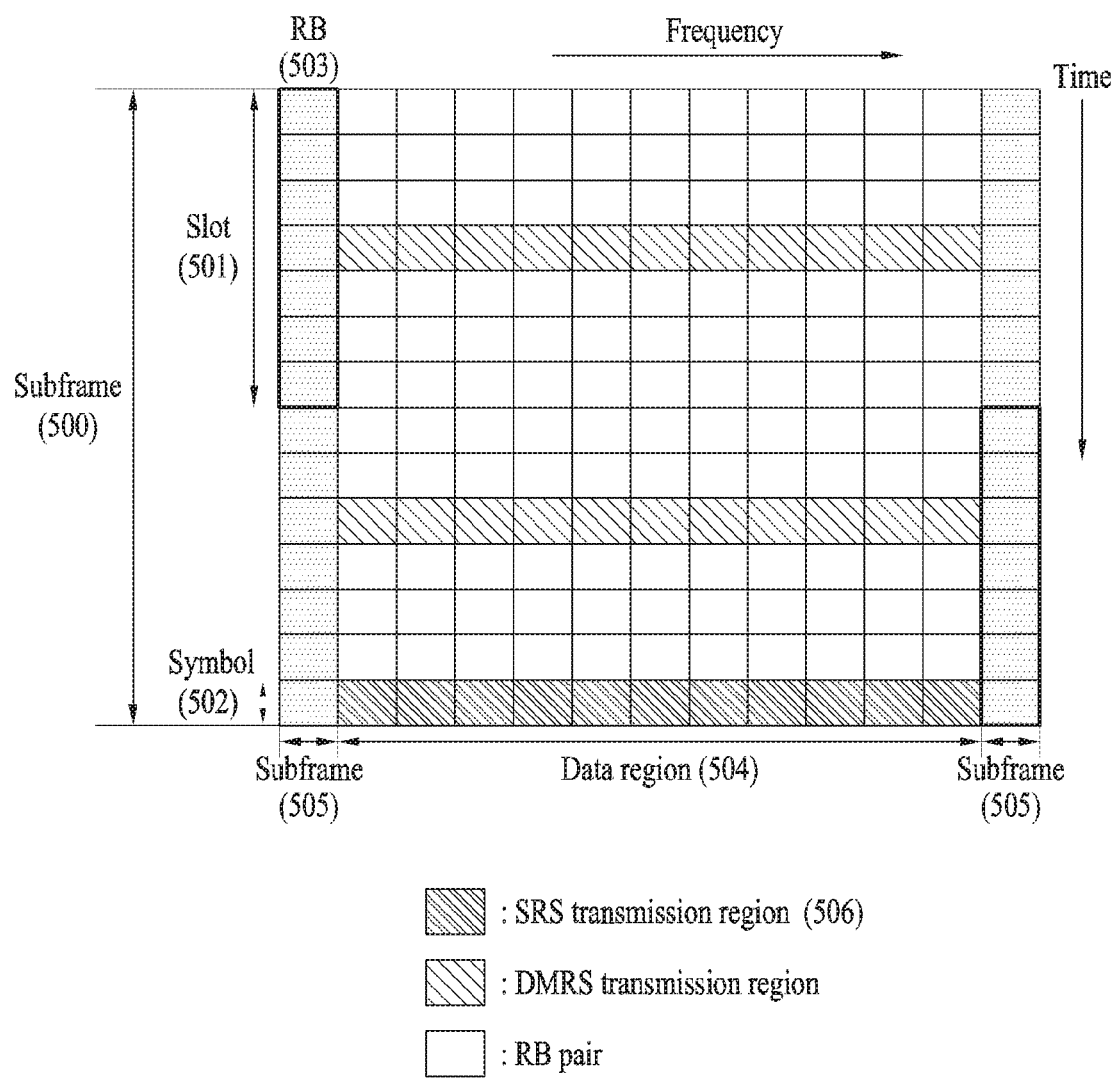
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 7:
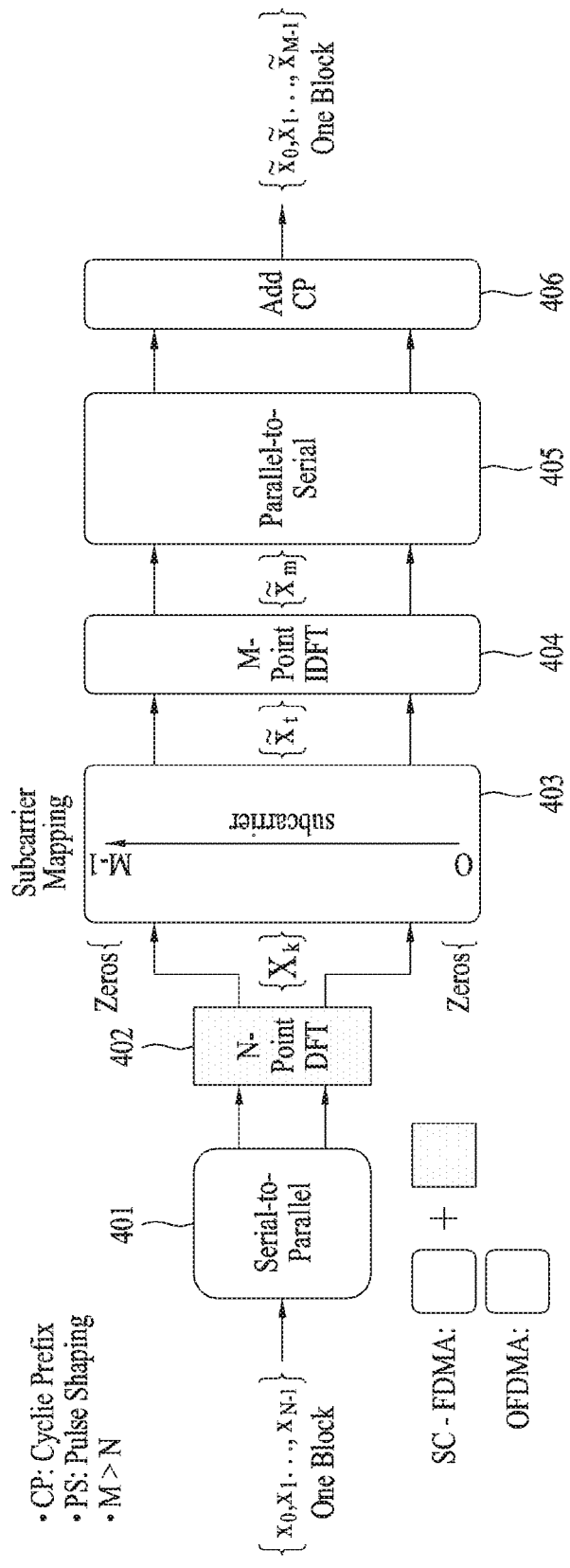
FIG. 7 illustrates Single Carrier Frequency Division Multiple Access (SC-FDMA) scheme and Orthogonal Frequency Division Multiple Access (OFDMA) scheme.

FIG. 7 illustrates SC-FDMA and OFDMA schemes. The 3GPP system employs OFDMA in downlink and uses SC-FDMA in uplink.

Referring to FIG. 7, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Figure 8:
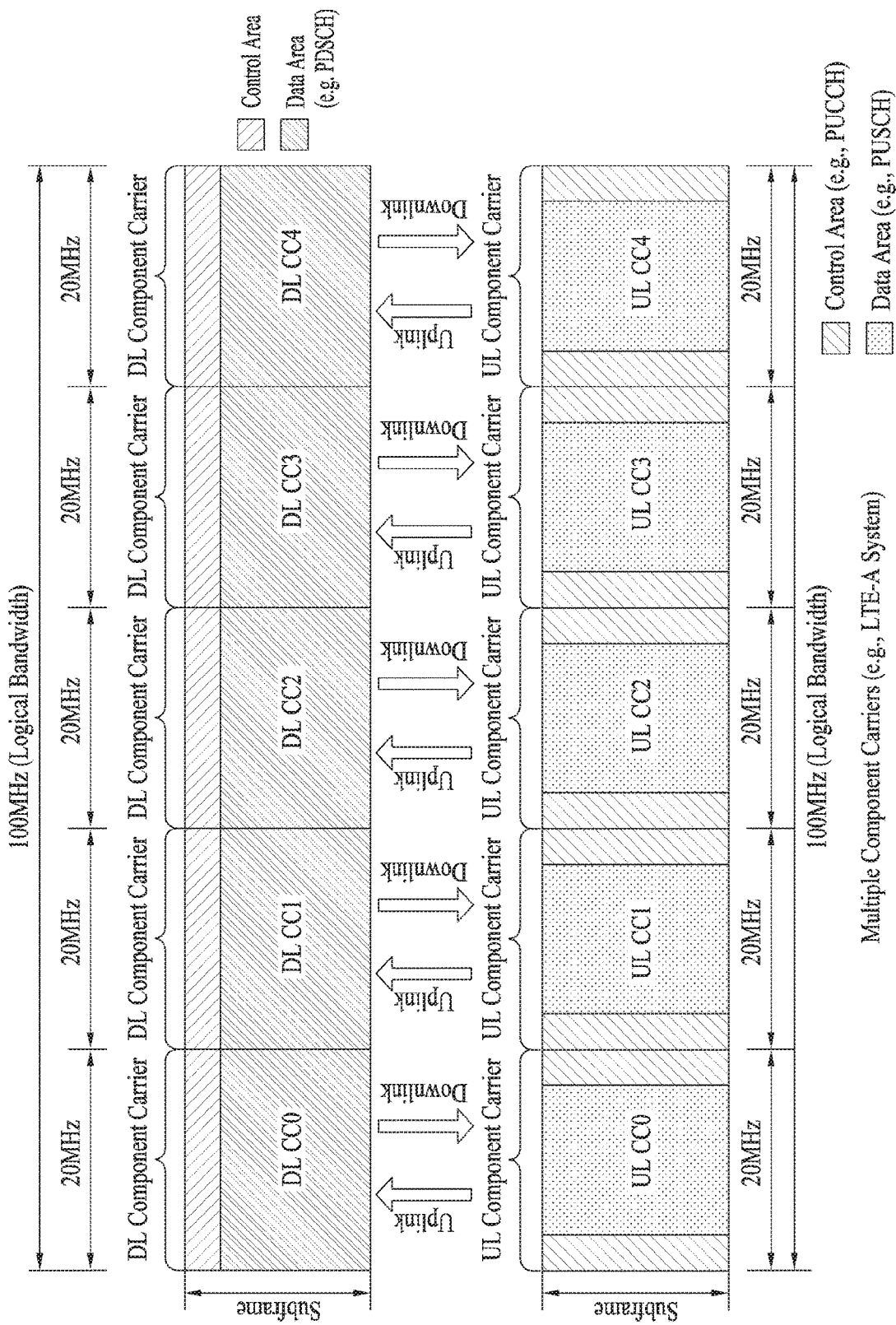
FIG. 8 illustrates a carrier aggregation (CA)-based wireless communication system.

FIG. 8 illustrates carrier aggregation (CA) communication system.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 9:
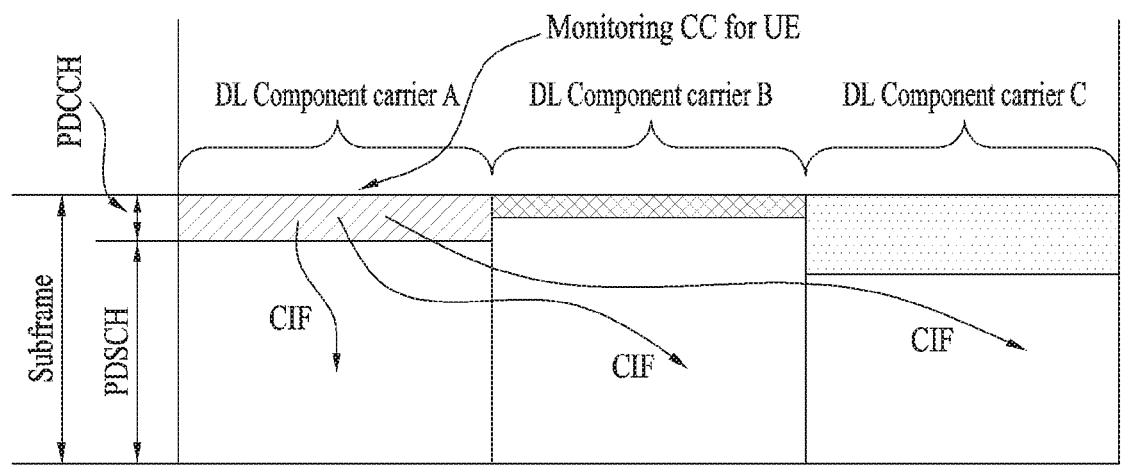
FIG. 9 illustrates cross-carrier scheduling.

FIG. 9 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Furthermore, in a millimeter wave (mmW) system, a wavelength of a signal is short, so that a multitude of antennas can be installed in the same area. For example, since the wavelength is 1 cm in a 30 GHz band, a total of 100 antenna elements can be installed in a 5-by-5 cm² panel in a form of a two-dimensional array with a 0.5λ (wavelength) spacing. Therefore, in the mmW system, a plurality of antenna elements are used to increase a beamforming (BF) gain to increase a coverage or increase a throughput.

In this connection, when each antenna element has a TXRU (transceiver unit) so that transmission power and phase can be adjusted for each antenna element, independent beamforming may be realized for each frequency resource. However, installing each TXRU in each of all 100 antenna elements is ineffective in terms of cost. Therefore, a scheme of mapping a plurality of antenna elements to one TXRU and adjusting a direction of the beam with an analog phase shifter is considered. This analog beamforming scheme may form only one beam direction in a full band, and has a disadvantage that a frequency selective beam cannot be achieved. Thus, as an intermediate form between digital BF and analog BF, a hybrid BF in which B TXRUs map to Q antenna elements (B<Q) may be considered. In this case, a number of directions of a beam in which the beam is simultaneously transmitted is limited to a number smaller than or equal to B, though it varies depending on a connection scheme between the B TXRUs and Q antenna elements.

Figure 10:
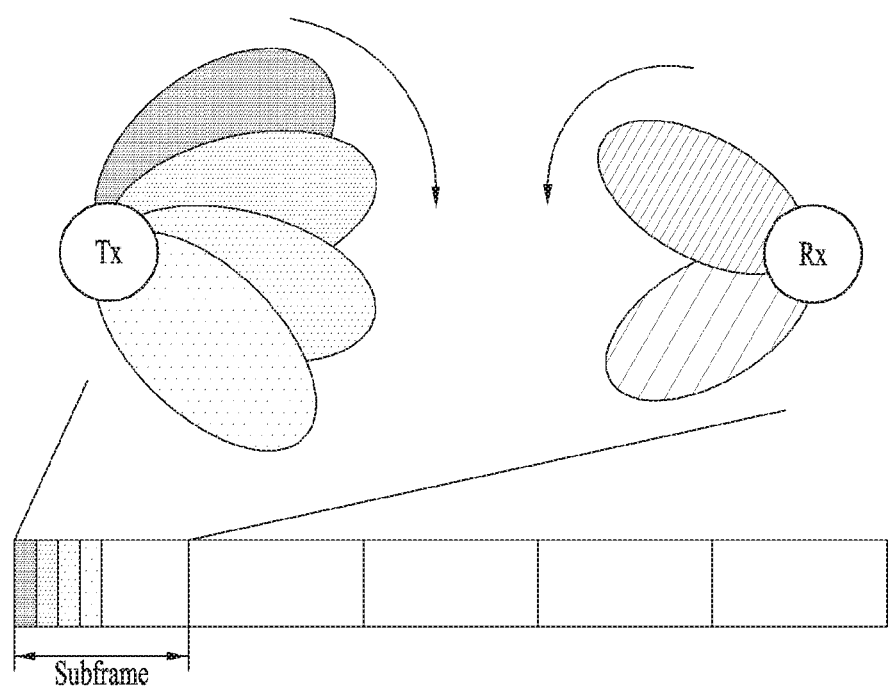
FIG. 10 illustrates analog beamforming.

FIG. 10 illustrates analog beamforming. Referring to FIG. 10, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time.

Figure 11:
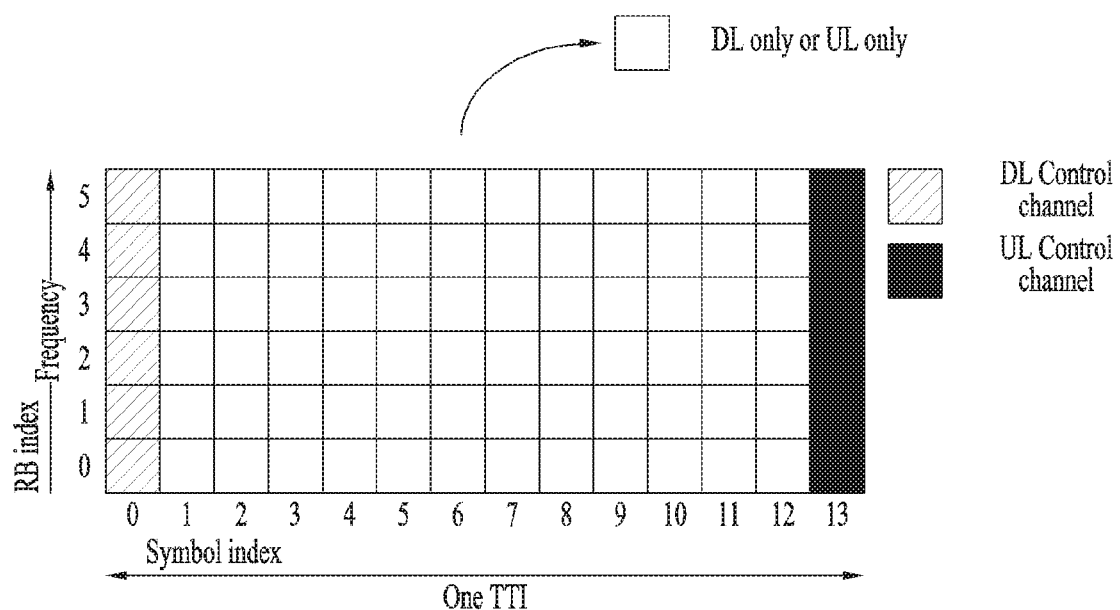
FIG. 11 illustrates a structure of a self-contained subframe.

In next-generation RAT (Radio Access Technology), a self-contained subframe is considered in order to minimize data transmission latency. FIG. 11 illustrates a self-contained subframe structure. In FIG. 11, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+ UL control period

DL control period+DL data period

DL control period+GP+UL data period+UL control period

DL control period+GP+UL data period

A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Embodiment

In the new RAT system, it is likely that the base station (BS) will operate to perform TX/RX (analog or hybrid) beam-forming for DL/UL signal transmission/reception based on the mmW characteristic. First, in a case of a DL, a base station may transmit a plurality of specific user equipment-common signals (for example, synchronous signals or reference signals) having different beam directions (for example, beam ID or index) in a predetermined duration (TX-beam sweeping by base station). A user equipment (UE) may scan the TX beams to report to the base station information (for example, beam ID or index) about a preferred beam that is most optimal (that is, has good quality) among the received specific signals (that is, beam directions) (RX-beam sweeping by user equipment). Conversely, in the case of UL, it may be necessary for the BS to scan the RX-beams to determine the best beam direction in which the base station receives a specific signal transmitted from the user equipment (this is contrary to the DL case).

Hereinafter, effective UL channel sounding signal configuration and transmission method with considering the RX-beam scanning operation and self-contained SF type operation in the new RAT system will be proposed. As used herein, an OFDM symbol may be replaced with an OFDM-based symbol, e.g., an OFDMA symbol, SC-FDM, or SC-FDMA. Further, unless stated otherwise, as used herein, a duration refers to a time period in a time domain.

Configuration and transmission of multi-symbol SRS within predetermined duration for RX-beam scanning In order to allow the base station to perform RX-beam scanning (or sweeping), the user equipment may operate to repeatedly N times transmit an SRS symbol configured using the same UL resource (for example, the same sequence and/or frequency resource) within a predetermined duration (hereinafter, beam-scan duration) (N>1). The beam-scan duration may be configured to be a plurality of subframes (i.e., SF), a plurality of OFDM symbols (i.e., OS), or one OS. The number N of SRS symbols repeatedly transmitted in the beam-scan duration may be configured in a semi-static manner for the user equipment via RRC signaling. Alternatively, the number N may be dynamically indicated to the UE via a DL/UL grant DCI or specific user equipment-common DCI. In this connection, the N SRS symbols may constitute one SRS transmission instance. When a periodic SRS transmission is indicated, each SRS transmission instance is periodically configured based on a subframe period/offset. The SRS symbol means an OFDM symbol on which the SRS is transmitted.

In one example, when the beam-scan duration is configured to be (N×K) SFs, the same SRS symbol (using the same UL resource) may be transmitted N times at a K SF interval (e.g., K=1). When the beam-scan duration is configured to be (N×M) OSs, the same SRS symbol may be transmitted N times at an M OS interval (for example, M=1). In another example, when the beam-scan duration is configured to be a number of OSs>N (for example, 2 when considering N>2) or one OS, the same SRS symbol (with a small duration) may be transmitted repeatedly N times (consecutively) within the beam-scan duration. In this case, one SRS symbol may be configured to have a shorter duration than one OS (short-SRS). For convenience, an OS used for transmission of a general DL/UL signal (for example, data) (hereinafter, non-SRS signal) will be referred to as a normal OS, while an OS used for short-SRS transmission will be referred to as a short OS. Further, a time length of the normal OS is referred to as normal (OS) duration, and a time length of the short OS is referred to as short (OS) duration. Unless otherwise specified below, the OFDM symbol (OS) refers to the normal OS.

When the beam-scan duration is configured to be one OS, following two methods may be considered which configures/transmits the same N multiple short-SRS symbols within the beam-scan duration. The same principle/operation as in the methods may be applied when, in a situation where N≥2, the beam-scan duration is configured to be two Oss.

(1) Method 1: Method for Increasing Subcarrier Spacing Itself for IFFT/FFT

Figure 12:
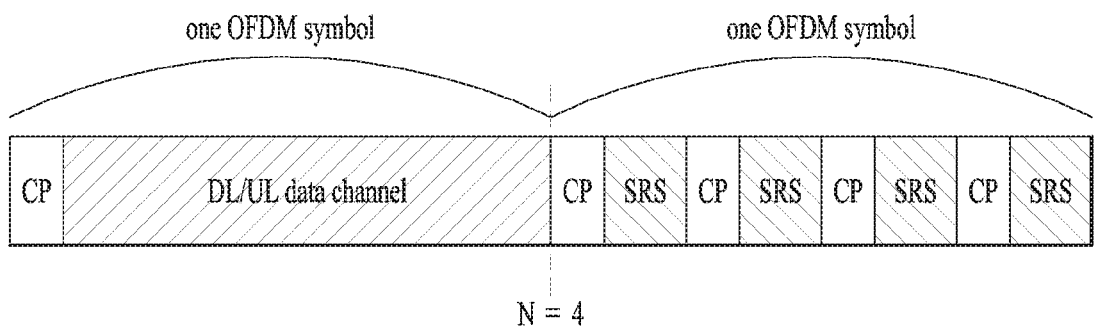
FIG. 12 to FIG. 15 illustrate a SRS (Sounding Reference Signal) transmission structure according to the present invention.

In this method, in one approach, a short-SRS symbol may be generated such that a subcarrier (i.e., SC) spacing for IFFT/FFT of a SRS signal is increased (N+L) times compared to that applied for generation of an OS for a general DL/UL signal (for example, a DL/UL data channel, non-SRS signal). For example, when the SC spacing for the general DL/UL signal is defined as R [kHz], the SC spacing for generation of the short-SRS symbol may be configured to be R×(N+L) [kHz]. Then, individual CPs may be added to the thus-configured N short-SRS symbols respectively, which, in turn, may be concatenated into multi-symbol SRSs within one OS duration which, in turn, may be transmitted in one OS duration (See FIG. 12). In this connection, L may be determined/configured as an appropriate integer value with taking into account the addition of N CPs within the single OS duration. That is, L may be determined/configured as an appropriate integer value so that N short-SRSs and N CPs may be present within the single beam-scan duration. A length Ls of each CP added to each short-SRS may be configured to be equal to or different (depending on the value of L) from a length Lo of a CP added to an OS for the general DL/UL signal (for example, DL/UL data channel). For example, when L is set as a specific value T, and, Ls=Lo, followings may be met: when L<T, Ls<Lo, while when L>T, Ls>Lo. The L value may be semi-statically configured for the user equipment, for example, via a RRC signaling, Alternatively, the L value may be dynamically indicated via a DL/UL grant DCI or specific user equipment-common DCI.

Figure 13:
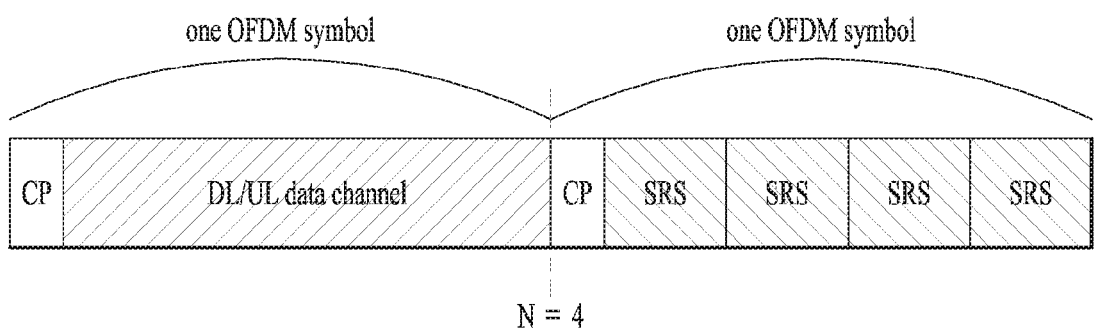

In another approach, a short-SRS symbol may be generated such that a subcarrier (i.e., SC) spacing for IFI-T/FFT of a SRS signal is increased N times compared to that applied for generation of an OS for a general DL/UL signal (for example, a DL/UL data channel, non-SRS signal). For example, when the SC spacing for the general DL/UL signal is defined as R [kHz], the SC spacing for generation of the short-SRS symbol may be configured to be R×N [kHz]. Then, a single CP may be added to all of the thus-configured N short-SRS symbols which, in turn, may be concatenated into multi-symbol SRSs within one OS duration which, in turn, may be transmitted in one OS duration (See FIG. 13). Since a short-SRS signal configured using the same (time) sample is repeated, a n-th short-SRS signal located at an n-th time in the time domain may serve as a CP for a (n+1)-th short-SRS signal (a temporal subsequent sample following a sample corresponding to the n-th short-SRS signal) immediately adjacent to the n-th short-SRS signal.

In one embodiment, a UL data channel (for example, PUSCH) and a UL control channel (for example, PUCCH) may be resource-scheduled/configured to be transmitted in an OS duration containing the OS duration corresponding to the plurality of short SRS symbols. In this case, a subcarrier (SC) spacing (for example, that applied to the configuration of the short-SRS signal) greater than that applied to the OS generation of the general data may be applied to the OS duration corresponding to the plurality of short SRS symbols to configure and transmit the UL data/control channel signals. On the other hand, the SC spacing applied to the OS generation of the general data may be applied to a remaining OS duration except for the OS duration corresponding to the plurality of short SRS symbols to configure and transmit the UL data/control channel signals.

Figure 14:
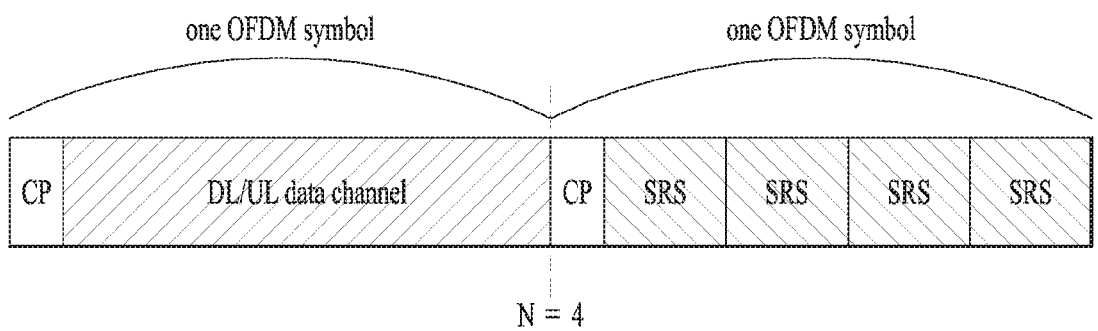
Figure 15:
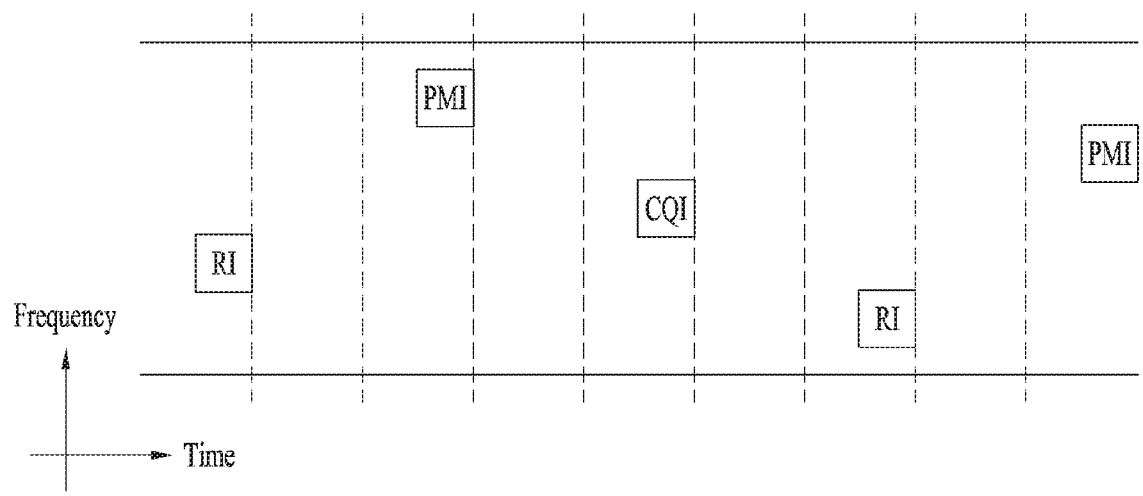

(2) Method 2: Method for Increasing Spacing Between Subcarriers to which SRS Signals are Mapped In this method, the SC spacing for the IFFT/FFT of the SRS signal may be configured/applied to be same as that (for example, R [kHz]) applied for the general DL/UL signal. Further, in this method, each SRS signal may only be mapped to a SC set of N SCs having the equal spacing to each other. For example, the SRS signal may be mapped to an SC index (k×N)=0, N, 2N, (k=0, 1, 2, . . . ). In addition, an offset of 0 to N−1 may be applied to the SC index (k×N), and the offset value may be given differently between UEs/between antennas. Accordingly, a repeated short-SRS transmission may be generated in which the same short-SRS signal is transmitted repeatedly N times on the time axis. For example, when an IFFT/FFT size is B (point), the same short-SRS signal configured with N/B (time) samples is transmitted repeatedly N times. The multi-symbol SRS may be configured/transmitted within a single OS duration such that only one CP is added to all of the repeated SRS signals (See FIG. 14). Since a short-SRS signal configured using the same (time) sample is repeated, a n-th short-SRS signal located at an n-th time in the time domain may serve as a CP for a (n+1)-th short-SRS signal (a temporal subsequent sample following a sample corresponding to the n-th short-SRS signal) immediately adjacent to the n-th short-SRS signal. In this scheme, the CP overhead does not increase, whereas SC indices other than specific SC indices (for example, (k×N)) may not be used for configuration/transmission of the multi-symbol SRS (or any UL signal including the same).

In another approach to Method 1/2, N short-SRS signals may be configured/transmitted such that the N short-SRS signals are assigned to No OSs. Specifically, N/No short SRSs may be allocated to each of the No OSs (based on Method 1/2). In this approach, N in Methods 1/2 may be replaced with N/No. Further, as mentioned in Method 1/2, each CP may be added to each OS, or one CP may be added to each of N/No short-SRSs within each OS, to allow the multi-symbol SRS signal to be configured/transmitted. No OSs may be configured as (adjacent) OSs within the same SF, or alternatively, the No OSs may be configured as OSs within different SFs.

In one embodiment, in another UL-beam scanning method based on beam-scan duration (i.e., plural SFs, plural OSs, or one OS) and Method 1/2, the user equipment may form a different TX-beam for each SRS or short-SRS (using different combinations of antenna ports) and then transmit N SRSs or short-SRSs (i.e., the user equipment performs the TX-beam sweeping operation). The base station may receive the SRS signal by forming a specific RX-beam (ID) or without a formation of a separate RX-beam (for example, in an omni-directional manner), and, then, may select/determine the best TX-beam. To this end, the user equipment may report in advance to the baste station the number of possible TX-beams (or the number of possible antenna port combinations) or the information from which such a number may be derived. For example, this report may be carried out via an initial connection procedure or RRC connection. Thereafter, the base station may indicate to the user equipment the (best) TX-beam ID or index (or antenna ports combination information) as selected/determined by the UL-beam scanning process. Then, the user equipment may use the indicated (best) TX-beam ID (or antenna ports combination) from the base station to perform at least one of the UL data channel transmission, the UL control channel transmission, and the random access preamble/channel transmission until there is an update from the base station for a new (best) TX-beam ID (or antenna port combination) (based on a subsequent UL-beam scanning).

In another UL-beam scanning scheme, the user equipment repeatedly Nr times may transmit each of Nt SRSs or short-SRSs based on different TX-beam IDs. The base station may form Nr different RX-beams for the Nr (repeated) SRSs or short-SRSs based on the same TX-beam ID (per TX-beam ID) and receive the SRSs and then may select/determine the best TX/RX-beam combination. In this connection, Nt represents the number of TX-beams (or the number of possible antenna port combinations) obtainable by the user equipment. Nr represents the number of RX-beams (or the number of possible antenna port combinations) obtainable by the base station. Further, Nt×Nr SRS symbols may constitute one SRS transmission instance and may be contained within one beam-scan duration.

In this scheme, in one example of a multi-symbol SRS configuration/transmission, Nr short SRSs may be allocated to each of the Nt OSs (based on Method 1/2). For example, in this scheme, N in Methods 1/2 may be replaced with Nr. Therefore, a short-SRS configured in a single OS may be repeatedly transmitted N times based on the same TX-beam ID, while short-SRS signals configured in different OSs may be transmitted based on different TX-beam IDs (hereinafter, Alt 1). Further, according to the method shown in Method 1/2, only one CP may be added to each OS, or one CP may be added to each of Nr short-SRSs in each OS, so that a multi-symbol SRS signal may be configured/transmitted. Nt OSs may be configured as (neighboring) OSs within the same SF, or as OSs within different SFs.

In another example of multi-symbol SRS configuration/transmission for the UL-beam scanning operation, Nt short-SRSs may be allocated to each of Nr OSs (based on Method 1/2). In this example, N in Methods 1/2 may be replaced with Nt. Nt short SRS signals configured in a single OS may be transmitted once based on different TX-beam IDs. That is, an OS configured to map to Nt short SRSs based on different TX-beam IDs may be repeatedly transmitted Nr times (Hereinafter, Alt 2). The Nr OSs may be configured as (neighboring) OSs within the same SF or as OSs within different SFs.

In the case of the Alt 1 scheme, since the same TX-beam ID is maintained for a single OS, the user equipment may simultaneously transmit a plurality of short-SRS signals and a general UL channel/signal configured using a normal symbol (not a short symbol), based on the same TX-beam ID in the single OS. In the case of the Alt 2 scheme, since the same RX-beam ID is maintained for the single OS, the base station may simultaneously receive a plurality of short-SRS signals and a general UL channel/signal configured using a normal symbol (not a short symbol), based on the same RX-beam ID in the single OS.

In one embodiment, for an UL-beam scanning operation (based on the Alts 1/2), the Nt value, the Nr value, and corresponding SF and OS information (for example, configuring the beam-scan duration (for example, index) may be configured for the user equipment. In this connection, the base station may indicate to the user equipment the (best) TX-beam ID or index (or antenna ports combination information) as selected/determined by the UL-beam scanning process based on the Nt value, the Nr value, and corresponding SF and OS information as configured. Then, the user equipment may use the indicated (best) TX-beam ID (or antenna ports combination) from the base station to perform at least one of the UL data channel transmission, the UL control channel transmission, and the random access preamble/channel transmission until there is an update from the base station for a new (best) TX-beam ID (or antenna port combination) (based on a subsequent UL-beam scanning) In one embodiment, Methods 1/2 may be applied differently to the Alt 1/2 schemes. In one example, Method 2 may be applied to the Alt 1 scheme, while method 1 may be applied to the Alt 2 scheme.

In one embodiment, the resource (for example, OS and/or SF) configured for the short-SRS transmission (based on Method 1/2) may be configured into an OS and/or SF reserved for the purpose of performing RX-beam scanning operations by the base station for a different specific UL channel/signal (for example, a random access (RA) preamble/channel) transmission. In one example, the OS resource allocated for transmissions of a plurality of short-SRS may be configured to be FMed with a specific UL channel/signal resource at the same time. In one example, the Nr OS resources allocated for transmissions of Nt short-SRSs (based on the Alt2) may be configured to be FDMed with a RA preamble/channel resource occupied at a different time therefrom.

In one embodiment, N or (Nt×Nr) SRS signals or short-SRS signals transmitted for UL-beam scanning purposes may all be configured to be transmitted at the same power. In one example, a power configured/applied for a SRS or short-SRS signal first transmitted based on a power-control parameter set for a specific TX-beam ID may be applied for the transmission of remaining SRSs or short-SRSs. In this connection, the specific TX-beam ID may be a TX-beam ID configured as the best or serving or operational beam ID from the base station. In this case, the user equipment may operate to transmit an SRS or short-SRS signal without power readjustment according to a power control command from the base station during transmission. Further, a power (a related parameter) to be equally applied to the SRS and short-SRS signal being transmitted for UL-beam scanning may be separately configured. In this case, the user equipment may operate to transmit an SRS or short-SRS signal without power readjustment according to a power control command from the base station during transmission.

In one embodiment, a time duration for transmission of a single SRS signal may be shortened when a short-SRS signal is configured/transmitted for UL-beam scanning, compared to when a SRS signal is configured/transmitted for general UL channel sounding. Thus, there is a possibility that a coverage of the short-SRS signal may be reduced (due to energy shortage) assuming the same transmission power. With considering this, a power with a specific offset (for example, more increased) from a power applied to the SRS signal transmission for a general purpose (for example, for a purpose of the UL channel sounding) may be applied to the short SRS signal transmission. The power offset may be configured to be proportional to a difference between the short SRS signal transmission time and the general SRS signal transmission time (for example, the larger the transmission time difference, the larger the value of the power offset).

Apply frequency hopping to UL control channel transmission for UL channel sounding Unlike the legacy LTE PUCCH configured/transmitted on an edge (on a frequency axis) of an entire system BW, an UL control channel (assigned to one user equipment) may be allocated/transmitted on the entire frequency band (or a frequency resource portion thereof) within a small number (for example, one) of OS durations in the new RAT system based on a self-contained SF structure. Therefore, we propose a method for applying frequency hopping (over time) to a transmission resource for a UL control channel carrying UCI (for example, HARQ-ACK, periodic CSI, SR) instead of SRS (for example, periodic SRS) for the purpose of UL channel sounding and UL resource efficiency.

Specifically, a frequency resource used for transmission of a UL control channel carrying (HARQ-ACK feedback and/or) cyclic CSI may be changed based on a specific hopping pattern (for example, per CSI reporting cycle or according to CSI reporting type (for example, RI, PMI, CQI) or on a specific time duration basis or based on a report SF number). In addition, a frequency resource used for transmission of a UL control channel carrying the SR may be changed based on a specific hopping pattern (for example, per SR transmission cycle or on a specific time duration basis, or according to transmission SF number). Further, for SR transmission, (not only in a case of a positive SR) but also in case of a negative SR, a corresponding UL control channel transmission may be performed such that periodic UL channel sounding may be performed. In this regard, it should be noted that a resource (for example, sequence, frequency) used for configuring the corresponding UL control channel, and/or DMRS (for example, cyclic shift, OCC) or a modulation symbol (for example, a QPSK constellation point), and the like may be differently allocated/mapped between the positive SR and the negative SR.

The method according to the present invention (for example, the multi-symbol UL signal configuration/transmission scheme for the RX-beam scanning (or sweeping)) is not limited to the SRS configuration/transmission. The method may be equally applied to random access preamble/channel configuration/transmission for UL random access and/or configuration/transmission of an UL control channel carrying UCI. For more generalized version of the present invention, as used herein, the user equipment may be replaced with a TX node sending a signal, and the base station may be replaced with a RX node receiving the signal. Further, the SRS may be replaced with a specific RS (i.e., beam-scan RS) as transmitted by the TX node and received by the RX node for a beam-scanning (or sweeping) purpose. In one example, the TX node may be the user equipment, the RX node may be the base station, and the beam-scan RS may be a specific UL signal (for example, UL SRS) transmitted for UL beam scanning from the user equipment to the base station. In this case, the RX-beam scanning (or sweeping) by the base station and/or the TX-beam scanning (or sweeping) by the user equipment may be performed. Alternatively, the TX node may be the base station, the RX node may be the user equipment, and the beam-scan RS may be a specific DL signal (for example, DL RS) transmitted for DL beam scanning from the base station to the user equipment. In this case, the RX-beam scanning (or sweeping) by the user equipment and/or the TX-beam scanning (or sweeping) by the base station may be performed.

Figure 16:
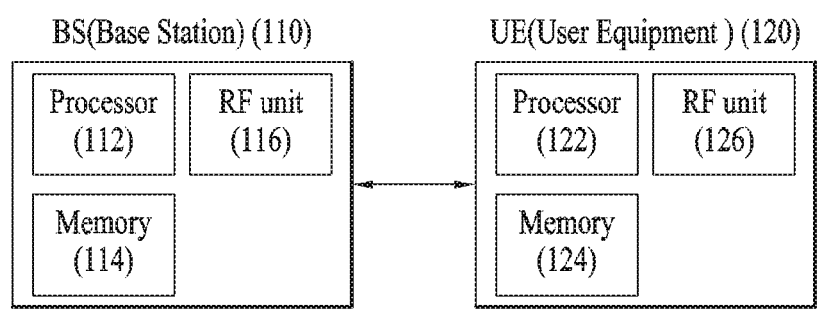
FIG. 16 illustrates a base station and a user equipment applicable to an embodiment of the present invention.

FIG. 16 illustrates a BS and a UE of a wireless communication system, which are applicable to embodiments of the present invention.

Referring to FIG. 16, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method for transmitting a signal by a user equipment in a wireless communication system, the method comprising:
    acquiring information about a number (Nr) of receive (RX) beams from a base station;
    transmitting a first Orthogonal Frequency Division Multiple Access (OFDMA) symbol having Nr Sounding Reference Signal (SRS) symbols; and
    transmitting a second OFDMA symbol having Nr SRS symbols,
    wherein SRS symbols in the same OFDMA symbol are transmitted in the same transmit (TX) beam direction,
    wherein SRS symbols in different OFDMA symbols are transmitted in different TX beam directions,
    wherein a subcarrier spacing of each of SRS symbols in the first OFDMA symbol is defined as R*(Nr+L) [KHz], and
    wherein R indicates a subcarrier spacing of a non-SRS signal, Nr indicates a number of the receive beams in the base station, and L indicates an integer of 1 or larger.

2. The method of claim 1, wherein the first and second OFDMA symbols are included in a single beam scan duration.

3. The method of claim 1, wherein the first OFDMA symbol and the second OFDMA symbol are adjacent to each other in the same subframe.

4. The method of claim 1, wherein a single cyclic prefix (CP) is allocated to an entirety of the SRS symbols in the first OFDMA symbol.

5. The method of claim 1, wherein a single cyclic prefix (CP) is allocated to each of the SRS symbols in the first OFDMA symbol.

6. A user equipment (UE) for a wireless communication system, the UE comprising:
   a radio frequency (RF) module; and
   a processor, wherein the processor is configured to:
   acquire information about a number (Nr) of receive (RX) beams from a base station;
   transmit a first Orthogonal Frequency Division Multiple Access (OFDMA) symbol having Nr Sounding Reference Signal (SRS) symbols; and
   transmit a second OFDMA symbol having Nr SRS symbols,
   wherein SRS symbols in the same OFDMA symbol are transmitted in the same transmit (TX) beam direction,
   wherein SRS symbols in different OFDMA symbols are transmitted in different TX beam directions,
   wherein a subcarrier spacing of each of SRS symbols in the first OFDMA symbol is defined as R*(Nr+L) [KHz], and
   wherein R indicates a subcarrier spacing of a non-SRS signal, Nr indicates a number of the receive beams in the base station, and L indicates an integer of 1 or larger.

7. The UE of claim 6, wherein the first and second OFDMA symbols are included in a single beam scan duration.

8. The UE of claim 6, wherein the first OFDMA symbol and the second OFDMA symbol are adjacent to each other in the same subframe.

9. The UE of claim 6, wherein a single cyclic prefix (CP) is allocated to an entirety of the SRS symbols in the first OFDMA symbol.

10. The UE of claim 6, wherein a single cyclic prefix (CP) is allocated to each of the SRS symbols in the first OFDMA symbol.

* * * * *